(12) United States Patent
Van Den Bosch et al.

(10) Patent No.: US 8,034,853 B2
(45) Date of Patent: Oct. 11, 2011

(54) POWDER COATING COMPOSITION

(75) Inventors: Guido R. Van Den Bosch, Hever-Schiplaken (BE); Carlos Rodriguez-Santamarta, Barcelona (ES); Anne De Marre, Boortmeerbeek (BE); Pip Niall Jones, Brussels (BE); Laurent Verite, Brussels (BE); Thomas Grawe, Leverkusen (DE)

(73) Assignees: E.I. du Pont de Nemours and Company, Wilmington, DE (US); Dupont Powder Coatings France SAS

( * ) Notice: Subject to any disclaimer, the term of this patent is extended or adjusted under 35 U.S.C. 154(b) by 165 days.

(21) Appl. No.: 12/431,396

(22) Filed: Apr. 28, 2009

(65) Prior Publication Data

US 2010/0273933 A1   Oct. 28, 2010

(51) Int. Cl.
 C09B 67/00   (2006.01)
(52) U.S. Cl. ............................... 523/333; 523/334
(58) Field of Classification Search .................. 523/333, 523/334
See application file for complete search history.

(56) References Cited

U.S. PATENT DOCUMENTS

| 6,133,344 | A | 10/2000 | Blatter et al. |
| 6,433,030 | B1 | 8/2002 | Blatter et al. |
| 2006/0173098 | A1 | 8/2006 | Tsujimoto |
| 2007/0028806 | A1 | 2/2007 | Piro |
| 2007/0107633 | A1 | 5/2007 | Piontek |

FOREIGN PATENT DOCUMENTS

| EP | 1061419 A | 12/2000 |
| EP | 826746 A | 7/2002 |
| JP | 11279464 A | 10/1999 |
| JP | 11286635 A | 10/1999 |
| JP | 2001288414 | 10/2001 |
| WO | 99/50360 A1 | 10/1999 |
| WO | 2006/047238 | 5/2006 |
| WO | 2007/140131 | 6/2007 |
| WO | 2007/087169 | 8/2007 |

*Primary Examiner* — Edward Cain

(57) ABSTRACT

The invention provides a powder coating composition prepared from a combination, the combination comprising:

A) at least one binder resin and, optionally at least one curing agent,

B) at least one calibrated pigmented liquid, based on at least one pigment, and, C) optionally, at least one pigment and/or extenders and/or additive.

The powder coating composition of the invention provides a precise color of the coatings having a desired color with high color stability. Therefore there is no need for additional adjustment tests or re-working procedures, and, therefore, it makes it possible to offer efficient, small-batch manufacture of custom colors, for example, to match a swatch of fabric supplied by a customer.

7 Claims, No Drawings

POWDER COATING COMPOSITION

FIELD OF THE INVENTION

The invention refers to a powder coating composition providing a highly reproducible colour strength and colour position accuracy in the final coating.

BACKGROUND OF THE INVENTION

Pigmented powder coating compositions that meet a customer's colour specifications require a labour-intensive multi-step approach during their preparation, for example, batch mixing, extrusion, further processing and coating of powder samples, measurements of colour, laboratory tests, adjustment of the raw materials and re-mixing and re-processing, re-mixing with extra pigment. In general, it is difficult to achieve the desired colour without correction steps because of batch to batch pigment variability and equipment performance variability.

One way to solve this problem is the provision of a limited number of stored, intermediate coating compositions which are combined, depending on the desired colour effect, and corresponding to the specific customer needs. Thus, there exists in the literature a number of examples describing dry-blends of powder coating compositions by mixing powder coating intermediate compositions having different colours, for example, WO 99/50360, EP-A 826 746, JP-A 11279464, JP-A 11286635.

WO 98/36030 describes a coloured powder coating composition consisting of two or more colour formulations which are dry-mixed together. The particles of one formulation are coloured and the particles of the other formulation have a different colour, or are optionally colourless. The composition forms a continuous coating, and the differences in colour cannot be differentiated by human eye.

WO 99/23068 discloses a process wherein different coloured fine powder compositions are compacted resulting in powders of uniform colours.

JP-A 52-47 031 describes the production of thermosetting powder paints, whereby the thermosetting resin, colour pigments and various additives are melt dispersed in a heating kneader. The preliminary dispersion composition of each original colour is mixed to obtain the desired colour, and the curing agent and optionally resins and additives are added to the mixture which is then melt mixed and pulverized.

However, these processes require the storage and production of appropriate finished coating compositions, e.g. pigmented coating powders or pigment-coated resins in a large number of different primary colours, in order to be able to produce the broadest range of final product colours. In addition, a uniform colour often cannot be obtained if the particle sizes of the different powder compositions to be mixed have too high value such as higher than, for example, 20 micrometers. Additionally, the production of such finely divided coating powders is energy-intensive and may create both dust explosion hazards and can also be inhaled by operators if not handled properly. Also, the coating powders will tend to absorb water if not stored properly, and coating powders with variable water content cannot be accurately measured in order to achieve a desired product colour, and agglomerated coating powders cannot be mixed as efficiently in order to produce a high quality final product.

JP 2001-288414 refers to a method for producing a powder coating which is suitable for the production of small batches of various colours using a few types of primary colour pellets and dry-mixing the types of pellets in suitable amounts to create the pre-determined coating colour followed by co-milling thereof. The powder pellets are produced by mixing, extruding and grinding of powder coating components with pigments and additives to obtain pellets having a specific colour.

WO 2006/047238 discloses the use of liquid pigment dispersions in which pigment is dispersed in a liquid polyester resin or optionally in a dispersing resin and solvent. This approach could not produce a high quality consistent product without multiple intermediate colour checks and adjustments to the powder coating during processing. For example, blue formulations could show weaker colour strength in a polyurethane (PUR) chemistry, but stronger colour strength in hybrid chemistry, compared to a traditional formulation. The converse could be true for formulations using a red pigment. Thus it is not proven that the use of pigmented liquid dispersions described led to improved colour strength in the final powder coating. Additionally, the use of liquid dispersing resins having a low glass transition temperature necessitates the use of further additives in the powder coating formulation to increase the glass transition temperature of the final product to give the required storage stability for the coating powder.

WO 2007/087169 and WO 2007/140131 refer to dispersions of polymer-enclosed colour-imparting particles for incorporating into powder coating compositions. The particles need to be prepared by polymerisation enclosure.

SUMMARY OF THE INVENTION

The present invention provides a powder coating composition prepared from a combination, the combination comprising:

A) at least one binder resin and, optionally at least one curing agent,

B) at least one calibrated pigmented liquid, based on at least one pigment, and, C) optionally, at least one pigment and/or extender and/or additive.

The powder coating composition of the invention provides a precise colour of the coatings having a desired colour with high colour stability. Therefore there is no need for additional adjustment tests or re-working procedures, and, therefore, it makes it possible to offer efficient, small-batch manufacture of custom colours, for example, to match a swatch of fabric supplied by a customer. The resulting coatings fulfil the requirements regarding properties of common powder coatings such as the desired colour, gloss, film appearance and mechanical properties. The colour and appearance of the final product is also less sensitive to variations in process equipment geometry and process conditions, thus ensuring that the powder coating can be produced at multiple locations whilst still delivering consistent product.

DETAILED DESCRIPTION OF THE INVENTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

Slight variations above and below the stated ranges can be used to achieve substantially the same results as values within the ranges. Also, the disclosure of these ranges is intended as a continuous range including every value between the minimum and maximum values.

Conventional binder resins and curing agents known to a person skilled in the art may be used as component A) of the invention.

Examples of binder resins are polyester resins, urethane resins, polyester urethane resins, polyester epoxy resins, epoxy resins, (meth) acrylic resins, alkyd resins and melamine/urea/formaldehyde resins.

Suitable polyester resins may be either acid or hydroxyl functional, depending on the cross-linking chemistry used. For example, hydroxyl functional polyester resins may have a hydroxyl number in the range of, for example, 30 to 350 mg KOH/g resin, and carboxyl functional polyester resin may have an acid number in the range of, for example, 10 to 200 mg KOH/g resin. The polyesters may be produced in a conventional manner by reacting one or more aliphatic, aromatic or cycloaliphatic di- or polycarboxylic acids, and the anhydrides and/or esters thereof with polyalcohols, as is, for example, described in D. A. Bates, *The Science of Powder Coatings*, volumes 1 & 2, Gardiner House, London, 1990, and as known by the person skilled in the art.

Suitable (meth)acrylic resins include, for example, copolymers prepared from alkyl(meth)acrylates with glycidyl (meth)acrylates and olefinic monomers; functionalized resins such as polyester (meth)acrylates, epoxy (meth)acrylates, urethane (meth) acrylates, glycidyl(meth)acrylates.

The term (meth) acrylic is respectively intended to mean acrylic and/or methacrylic.

Crystalline and/or semi-crystalline binder resins are also usable which have a Tm (melting temperature) in the range of e.g., 50 to 200° C., determined by means of differential scanning calorimetry (DSC).

Preferred is the use of polyester resins, polyester urethane resins, polyester epoxy resins and/or (meth) acrylic resins. Particularly preferred is the use of polyester resins and/or (meth) acrylic resins.

The content of at least one binder resin in component A) of the combination according to the invention can be in a range between 50 and 100 parts per weight, preferably, between 60 and 97 parts per weight, parts per weight based on component A), depending on the cross-linking chemistry of the binder resin and curing agent of component A).

The binder resins may comprise self cross-linkable resins containing cross-linkable functional groups known by a person skilled in the art. In this case, no curing agent needs to be used in the composition according to the invention.

The final product can also be cross-linked by using at least one curing agent (cross-linker) in component A) suitable for the binder resins known by a person skilled in the art. Examples of curing agents are blocked cycloaliphatic, aliphatic or aromatic polyisocyanates; agents containing epoxy groups, such as, for example, triglycidyl isocyanurate (TGIC); polyglycidyl ethers based on diethylene glycol; glycidyl functionalized (meth) acrylic copolymers; agents containing amino, amido, (meth)acrylate and/or hydroxyl groups, for example hydroxyl alkylamide crosslinker, as well as vinyl ethers. Furthermore, conventionally curing agents such as, dicyanodiamide hardeners, carboxylic acid hardeners or phenolic hardeners are usable.

For example, the ratio of a polyester resin as binder resin to TGIC as curing agent can be between 90:10 and 98:2; the ratio of a polyester resin as binder resin to PRIMID® (EMS-Chemie AG, Germany) as curing agent can be, for example, 90:10 and 97:3; the ratio of an acid functional polyester as binder resin to a glycidyl functional (meth)acrylate resin as curing agent can be, for example, between 50:50 and 70:30. The amounts may be above or below these ranges, depending, for example, on the binder resin properties, on the acid number of the polyester and/or on the epoxy-equivalent weight of the (meth)acrylate resin, as known to a person skilled in the art.

The content of component A) in the combination used for preparation of the composition according to the invention is 20 to 99.9 weight %, preferably 30 to 90 weight % and most preferably 40 to 80 weight %, the weight % based on the total weight of the combination A) to C) of the invention.

The combination according to the invention comprises as component B) at least one calibrated pigmented liquid. Pigmented liquid means that these are liquids, solvent-borne and/or water-borne, as solution and/or dispersion, comprising at least one pigment. Preferred is the use of at least one water-borne calibrated pigmented liquid.

The at least one calibrated pigmented liquid may contain at least one pigment, and may comprise at least one polymeric dispersant for stabilisation the pigment in the liquid.

The calibrated pigmented liquids are produced in such a way that they have and provide a highly reproducible colour strength and well-defined colour information in order to provide a desired colour or defined colour specification of the coating based on the powder coating composition of the invention, independently of the used pigment or source of pigment, and independently of the used processing techniques by using, for example, different types of extruders or different extruder processing. This also means that a minimal amount of pigment is required and that the variations in the manufacturing process will not give differences in colour strength, as would occur if the powder coating formulation contains solid pigments or pigment agglomerate-containing liquids. For example, the extruder shear history, for example, by using different extruder geometries, will not affect the calibrated pigmented liquids nor change the final powder coating colour.

Calibrated pigmented liquids used in liquid coating businesses, thus referred to as "tints", can be used for this invention. The benefit of the calibration is that a recipe that uses these calibrated pigmented liquids will give a well-defined final coating colour when known masses or volumes of raw materials are mixed together, irrespective of the natural colour strength of the pigment used to formulate this calibrated pigmented liquids. The calibrated pigmented liquids have proven storage stability and can thus be manufactured in large volumes and easily stored at local manufacturing sites.

The calibrated pigmented liquids are processed to maximise the colour strength that the pigments can achieve, and the colour strength and colour position are adjusted to a defined colour specification by a combination of dilution and addition of pigments and, when required, of other colorants.

Colour strength and colour position can be determined in terms of lightness (L), degree of red/green (a*) colour and degree of blue/yellow colour (b*) according to the CIE 1976 L*a*b* standard colour space method, which is an international standard for colour measurement, known at a person skilled in the art. Differences between the reference sample and a particular colour sample are shown as an absolute difference in L, a* and b* and are written as Delta L, Delta a and Delta b. Delta e is the total relative error and is the deviation in colour strength (lightness, L) and colour position (red/green and blue/yellow offset) of the colour values of a reference sample. Delta e can be calculated from Delta L, Delta a and Delta b according to the formula $\Delta e = (\Delta L + \Delta a + \Delta b)^{1/2}$.

The calibrated pigmented liquids contain between 0.5 and 80 weight % of at least one pigment, preferably between 3 and 50 weight % of at least one pigment, and they may contain between 10 and 90 weight % of water and/or solvent, the weight % based on the calibrated pigmented liquids. The calibrated pigmented liquids may optionally contain polymeric dispersants and other additives to improve the stability of the calibrated pigmented liquids, for example by preventing agglomeration or settling of the polymeric dispersants, as well as to give other desired properties of the calibrated pigmented liquids, such as a desired mixture viscosity.

The calibrated pigmented liquids can be prepared by combination of dilution and addition of pigments and, when required, of other colorants. For that, a solid pigment is transferred into a pigment liquid by mixing, for example in a mill, with water and/or solvent, optionally containing the above mentioned additives. The resulted pigment liquid provides a colour which can be determined by the above described CIE 1976 L*a*b* standard colour space method, and the colour is then adjusted (calibrated) to a defined colour specification. Such adjustment (calibration) can be carried out by addition of additional water and/or solvent and optionally additional additives, mentioned above, as well as optionally by addition, in a range of 0 to 20 weight % based on the calibrated pigmented liquid, of other pigments and/or colorants such as pigment dispersions, to result into the calibrated pigmented liquid.

Examples of colouring pigments used in the calibrated pigmented liquids are colour-imparting and/or special effect-imparting pigments and/or fillers (extenders). Suitable colour-imparting pigments are any conventional coating pigments of an organic or inorganic nature considering their heat stability which must be sufficient to withstand the curing conditions of the powder coating composition of the invention. Examples of inorganic or organic colour-imparting pigments are titanium dioxide, micronized titanium dioxide, carbon black, iron oxide, azo pigments, and phthalocyanine pigments. Examples of special effect-imparting pigments are metal pigments, for example, made from aluminium, copper or other metals, interference pigments, such as, metal oxide coated metal pigments and coated mica. Examples of usable extenders are silicon dioxide, aluminium silicate, barium sulfate, calcium carbonate, magnesium carbonate and micronized dolomite.

The at least one polymeric dispersant of the calibrated pigment liquid can be one or more resins formed by polymerisation and/or copolymerisation of monomers, particularly monomers having hydroxyl and/or acid functional groups, that lead to side groups along the polymer chain that stabilize the at least one pigment in the calibrated pigment liquid. The at least one polymeric dispersant can be resins having a sufficiently high glass transition temperature to give a stable final powder coating composition of the invention having little or no glass transition temperature modifiers. Examples of polymeric dispersants are resins formed by copolymerisation of hydrophobic and hydrophilic monomers. Preferred is the use of colourless polymeric dispersants.

It is possible to use at least one calibrated pigmented liquid, but it is also possible to use at least two calibrated pigmented liquids having different colour data, for example, different RAL colours. RAL colours mean the standard of the RAL (Reichsausschuss fuer Lieferbedingungen) Institute for colours, known to a person skilled in the art.

The content of component B) in the combination used for preparation of the composition according to the invention depends on the colour strength of the calibrated pigmented liquid or calibrated pigmented liquids that are used and the desired colour provided by the powder coating composition prepared from the combination of this invention. The content is typically 0.1 to 80 weight %, preferably 0.3 to 70 weight % and most preferably 0.5 to 45 weight %, the weight % based on the total weight of the combination A) to C) of the invention.

At least one pigment and/or extender and/or additive can be used as component C) of the combination according to the invention.

Examples of pigments are those as already mentioned above. Common extenders and additives are agents known to a person skilled in the art and may be solid or liquid. Examples of extenders (fillers) are barium sulfate, clay, calcium carbonate. Examples of additives are levelling agents, rheological agents such as highly dispersed silica or polymeric urea compounds, thickeners, for example based on partially cross-linked, carboxy-functional polymers or on polyurethanes, defoamers, wetting agents, anticratering agents, degassing agents, thermolabile initiators, antioxidants and light stabilizers based on HALS (hindered amine light stabilizer) products, tribo-charging agents, accelerators, initiators, inhibitors and catalysts. The additives can be used, in conventional amounts known to the person skilled in the art, for example, 0.01 to 10 weight %, based on the total weight of the combination.

The content of component C) in the combination used for preparation of the composition according to the invention will be between 0 and 50 weight %, based on the total weight of the combination A) to C) of the invention.

In particular, the present invention provides a powder coating composition prepared from a combination, the combination comprising A) 20 to 99.9 weight %, preferably 30 to 90 weight % and most preferably 40 to 80 weight %, of at least one binder resin and, optionally at least one curing agent, B) 0.1 to 80 weight %, preferably 0.3 to 70 weight % and most preferably 0.5 to 45 weight %, of at least one calibrated pigmented liquid, based on at least one pigment, and, C) 0 to 50 weight % of at least one pigment and/or extender and/or additive, the weight % based on the total weight of the combination A) to C).

The combination of A) to C) of the invention can be a mixture which is dried and further processed in order to give the final powder coating composition of the invention. The final powder coating composition will have between 0 and 7 weight %, preferably less than 3 weight % of residual water and/or solvent, the weight % based on the total weight of the powder coating composition.

The powder coating composition of the invention may be prepared by conventional manufacturing techniques used in the powder coating industry. For example, the components A) to C) can be blended together to a mixture, and then the mixture is extruded, at a temperature at which cross-linking (curing) does not occur.

A pre-mixing of the components of the combination prior to extrusion and to further processing can be done. For example, component A) and component C) can be incorporated into component B) of the invention. Pre-mixing can also be done by adding component B) to one of component A) and C) or to a mixture of component A) and C).

Most or all of the water and/or solvent content of component B) can be removed during processing, preferably either before or during the extrusion process. Examples of the method for removal of this water and/or solvent are vacuum extrusion, batch heating with or without vacuum, spray drying and other techniques known at a person skilled in the art.

The extrusion process is known to a person skilled in the art. In the extruder the mixture is melted and homogenized at a temperature in a range of, for example, 30 to 170° C. The extruded material is then cooled on chill rolls and/or chill bands and is broken up into pre-powder particles, which can be in the form of chips or pellets, followed by grinding to form a finely divided powder with a typical particle size for a coating powder, for example, an average particle size of 20 to 200 μm, preferably 30 to 60 μm. The resulting finished powder coating composition is usable without any additional adjustment tests or re-working procedures. The liquid content of the final powder coating composition is in the range of 0 and 7 weight %, preferably less than 3 weight %, based on the total weight of the powder coating composition.

Furthermore, specific components of the composition according to the invention, for example, additives, pigment, extenders, may be processed with the finished powder coating particles after extrusion and grinding by a "bonding" process using an impact fusion. For this purpose, the specific components may be mixed with the powder coating particles. During blending, the individual powder coating particles are treated to softening their surface so that the components adhere to them and are homogeneously bonded with the surface of the powder coating particles. The softening of the powder particles' surface may be done by heat treating the particles to a temperature, e.g. the glass transition temperature Tg of the powder coating composition, in a range, of e.g., 50 to 60° C. After cooling the mixture the desired particle size of the resulted particles may be proceed by a sieving process.

The final powder coating composition of the invention may be applied by techniques known in the art to a substrate, e.g., metallic substrates, non-metallic substrates, such as, paper, wood, plastics, glass and ceramics, including heat-sensitive substrates, and curing the applied composition. The final powder coating composition of the invention may be applied as a one-coating system or as coating layer in a multi-layer film build, onto pre-heated or non-pre-heated substrates. The powder coating composition according to the invention can be applied directly on the substrate surface, which can be a degreased substrate surface, or on a substrate pre-treated by techniques known in the art. The powder coating composition according to the invention can be applied also on a layer of a primer which can be a liquid or a powder based primer, for example, a conductive primer in case of coating of non-conductive substrates like wood or MDF.

The applied and melted powder can be cured by thermal energy. The coating layer may, for example, be exposed to convective, gas and/or radiant heating, e.g., infra red (IR) and/or near infra red (NIR) irradiation, as known in the art, to temperatures of, e.g., 100 to 300° C., preferably of 120 to 230° C. for convective thermal curing and preferably 200 to 280° C. for radiation heating processes (object temperature in each case). If the composition according to the invention is used together with unsaturated resins and, optionally photoinitiators or with unsaturated resin containing powders, dual curing may also be used. Dual curing means a curing method of the powder coating composition according to the invention where the applied composition can be cured, e.g., both by high energy radiation such as, e.g. ultra violet (UV) irradiation, and by thermal curing methods known by a skilled person.

The present invention is further defined in the following Examples. It should be understood that these Examples are given by way of illustration only. As a result, the present invention is not limited by the illustrative examples set forth herein below, but rather is defined by the claims contained herein below.

EXAMPLES

Example 1

Colour Values of Pigments of Prior Art, of Calibrated Pigmented Liquids and of Powder Coating Compositions According to the Invention The colour values of four different samples of a solid violet pigment (Hostaperm-Violett RL Spezial, Clariant) are measured using the CIE 1976 L*a*b* standard colour space method. The colour values are measured relative to a solid painted panel that is treated as the reference colour sample. The different samples of the violet pigment, comprising rheological additives, differ in the time of preparation by the supplier. The colour values can be found in Table 1.

TABLE 1

|  | Pigment sample 1 | Pigment sample 2 | Pigment sample 3 | Pigment sample 4 |
|---|---|---|---|---|
| Delta L | −0.19 | −0.24 | −0.56 | −0.2 |
| Delta a | 0 | −0.98 | −0.75 | −0.55 |
| Delta b | 0.14 | 1.06 | 0.88 | 1.07 |
| Delta e | 0.24 | 1.46 | 1.28 | 1.22 |

The colour values are described in terms of lightness (L), degree of red/green (a*) colour and degree of blue/yellow colour (b*) according to the CIE 1976 L*a*b* standard colour space method. Differences between the reference sample and a particular pigment sample are shown as an absolute difference in L, a* and b* and are written as Delta L, Delta a and Delta b. Delta e is the total relative error and is the deviation in colour strength (lightness, L) and colour position (red/green and blue/yellow offset) of the colour values of a reference sample. Delta e can be calculated from Delta L, Delta a and Delta b according to the formula $\Delta e = (\Delta L + \Delta a + \Delta b)^{1/2}$.

As shown in Table 1 the average colour deviation Delta e is 1.05.

Four calibrated pigmented liquids are prepared from the pigment samples 1 to 4 of the violet pigment described above.

For that the solid violet pigment sample(s) is(are) first milled with 5 to 20 weight % water containing a polymeric dispersant, in a media mill. The material in the mill is processed until no further increase in colour intensity is possible. The colour of the resulted colour liquid (un-calibrated) is then measured and compared to a reference colour sample required for each particular calibrated pigment liquid (colour specification).

For colour matching, to meet the colour specification, additional water and colourless stabiliser additive are then added to the colour liquid for calibrated pigmented liquid 1. For calibrated pigmented liquids 2, 3 and 4 additional water and colourless stabiliser additive as well as violet pigment dispersion Cromax Pro Dark Violet (DuPont), in a range of 0.5 to 10 weight %, are added to the colour liquids, for colour matching. The resulted calibrated pigmented liquids 1 to 4 contain 80 to 90 weight % of water, based on the calibrated pigmented liquid. The colour values can be found in Table 2.

TABLE 2

|  | Calibrated pigmented liquid 1 based on pigment sample 1 | Calibrated pigmented liquid 2 based on pigment sample 2 | Calibrated pigmented liquid 3 based on pigment samples 2 and 3 (mixture 1:1) | Calibrated pigmented liquid 4 based on pigment sample 4 |
| --- | --- | --- | --- | --- |
| Delta L | 0.24 | 0.19 | −0.09 | 0.02 |
| Delta a | 0.08 | 0.25 | 0.22 | 0.01 |
| Delta b | 0.15 | 0.23 | 0.04 | −0.11 |
| Delta e | 0.294 | 0.389 | 0.241 | 0.112 |

The colour values are measured as described above.

As shown in Table 2 the average colour deviation Delta e is 0.259.

A powder coating composition is prepared from each of the calibrated pigmented liquids 1 to 4 described above. Each calibrated pigmented liquid and the other components are mixed together and dried. The dried mixture is then extruded on a Buss extruder, under standard conditions, and the extrudate is cooled and milled to give a coating powder with an average particle size of between 40 and 60 micrometers. For measurement of the colour, each powder coating composition is sprayed onto a test panel and the panel is cured in an oven for 15 minutes at 180° C., giving a film thickness of between 60 and 80 micrometers. For the purposes of colour comparison, the panel produced from the powder coating composition 1 is defined as the standard (n/a), due to the colour values of the used pigment sample 1. The colour values can be found in Table 3.

The colour values are measured as described above.

As shown in Table 3 the average colour deviation Delta e is 0.526.

As it can be seen from Table 1 and Table 3 the use of the calibrated pigmented liquids has given a 50% reduction in the average colour deviation Delta e without any manual adjustment of the colour of the powder coating compositions, compared to the variability of the pigment samples 1 to 4, proving that a desired colour can be matched using the calibrated pigmented liquids in the powder coating compositions, without batch adjustment.

TABLE 3

| Components | Powder Coating Composition 1 amounts in parts per weight | Powder Coating Composition 2 amounts in parts per weight | Powder Coating Composition 3 amounts in parts per weight | Powder Coating Composition 4 amounts in parts per weight |
| --- | --- | --- | --- | --- |
| polyester URALAC P 841 (DSM) | 757.6 | 757.6 | 757.6 | 757.6 |
| curing agent PRIMID XL 552 (EMS Chemie) | 44 | 44 | 44 | 44 |
| flow additive RESIFLOW PV88 (Worlee Chemie) | 8.8 | 8.8 | 8.8 | 8.8 |
| BENZOINE | 2.4 | 2.4 | 2.4 | 2.4 |
| rheological additive LUVOTIX R (Lehmann&Voss) | 8 | 8 | 8 | 8 |
| wax additive | 6.4 | 6.4 | 6.4 | 6.4 |
| stabiliser additive IRGAFOS 126 (Ciba) | 8 | 8 | 8 | 8 |
| Titanium dioxide pigment TIPURE R706 dispersion (DuPont) | 285.13 | 285.13 | 285.13 | 285.13 |
| Calibrated pigmented liquid 1 | 28.51 | | | |
| Calibrated pigmented liquid 2 | | 28.51 | | |
| Calibrated pigmented liquid 3 | | | 28.51 | |
| Calibrated pigmented liquid 4 | | | | 28.51 |
| Colour Values | | | | |
| Delta L | n/a | −0.18 | −0.18 | −0.68 |
| Delta a | n/a | 0.26 | −0.06 | 0.41 |
| Delta b | n/a | −0.33 | 0.11 | −0.43 |
| Delta e | n/a | 0.457 | 0.219 | 0.903 |

Example 2

Colour Values of Powder Coating Compositions of Prior Art and According to the Invention Two premixes of light blue colour are prepared by mixing together the components, see Table 4. Premix 1 is formulated using the solid pigment Irgazin Blue A3RN (Ciba) while Premix 2 is formulated using a calibrated pigmented liquid of the pigment Irgazin Blue A3RN according to the invention. Premix 2 was dried as known in the art before being processed further.

Each premix is extruded once on a Buss extruder, under standard conditions. Half of each extruded sample is then extruded a second time, under same conditions, in order to increase the degree of shear history applied to each of the samples. This produces a total of four extruded samples which are then milled and applied to test panels, as mentioned above, for colour measurement. For the purposes of colour comparison, the panels produced from Premix 1 (1 extrusion)

and Premix 2 (1 extrusion) are defined as standards (n/a). The colour values can be found in Table 5. The colour values are measured as described above.

TABLE 4

| Components | Premix 1 amounts in parts per weight | Premix 2 amounts in parts per weight |
|---|---|---|
| URALAC P 841 | 947 | 947 |
| PRIMID XL 552 | 55 | 55 |
| RESIFLOW PV88 | 11 | 11 |
| BENZOINE | 3 | 3 |
| LUVOTIX R | 10 | 10 |
| wax additive | 8 | 8 |
| IRGAFOS 126 | 10 | 10 |
| TIPURE R706 | 150.18 | |
| TIPURE R706 dispersion | | 356.45 |
| Irgazin Blue A3RN (Ciba) | 6.42 | |
| calibrated pigmented liquid Cromax Pro Violet Blue (DuPont) | | 35.65 |

TABLE 5

| | Premix 1 (1 extrusion) | Premix 1 (2 extrusions) | Premix 2 (1 extrusion) | Premix 2 (2 extrusions) |
|---|---|---|---|---|
| L* | 62.18 | 61.77 | 58.68 | 58.71 |
| a* | −4.97 | −4.81 | −4.05 | −4.09 |
| b* | −31.86 | −32.16 | −33.16 | −33.16 |
| Delta e | n/a | 0.53 | n/a | 0.05 |

The colour measurements show that the composition based on Premix 2 including the calibrated pigmented liquid results in a 10-times lower average colour deviation Delta e after the extra extrusion step. This means that, at first, a desired colour can be matched without any manual adjustment, and, further, that this composition is less sensitive to the degree of shear applied during the manufacturing process.

What is claimed is:

1. A process for preparing a powder coating composition wherein said powder coating composition comprises:
   A) from 20 to 99.9 weight % of at least one binder resin and, optionally at least one curing agent,
   B) from 0.1 to 80 weight % of at least one calibrated pigmented liquid, based on at least one pigment, and,
   C) from 0 to 50 weight % of at least one other component selected from pigments, extenders, and additives,
   the weight % based on the total weight of the combination A) to C); wherein said process comprises the steps of; (i) incorporating the components A) and C) into component B), (ii) extruding the resulting mixture while (iii) removing water and/or solvent from component B) before or during the extrusion process.

2. The process of claim 1 wherein the total relative error in colour value of the powder coating composition when applied to a test panel and measured according to the CI E 1976 L*a*b* standard colour space method is less than the total relative error in colour value of a powder coating composition when applied to the same test panel wherein pigment component B) is not a calibrated pigmented liquid.

3. The process of claim 1 or claim 2 wherein the powder coating composition comprises:
   A) from 30 to 90 weight % of at least one binder resin and, optionally at least one curing agent,
   B) from 0.3 to 70 weight % of at least one calibrated pigmented liquid, based on at least one pigment, and,
   C) from 0 to 50 weight % of at least one other component selected from pigments, extenders, and additives,
   the weight % based on the total weight of the combination A) to C).

4. The process of claim 1 wherein the at least one binder resin is selected from the group consisting of polyester resins, urethane resins, polyester urethane resins, polyester epoxy resins, epoxy resins, (meth) acrylic resins, alkyd resins, and melamine/urea/formaldehyde resins.

5. The process of claim 4 wherein the at least one calibrated pigmented liquid is a water-borne calibrated pigmented liquid.

6. A process for coating a substrate comprising the steps (a) applying the powder coating composition formed by the process of claim 1 onto the substrate, and (b) curing the applied composition.

7. A process for preparing a powder coating composition wherein said powder coating composition is prepared from:
   A) from 20 to 99.9 weight % of at least one binder resin and, optionally at least one curing agent,
   B) from 0.1 to 80 weight % of at least one calibrated pigmented liquid, based on at least one pigment, and,
   C) from 0 to 50 weight % of at least one other component selected from pigments, extenders, and additives,
   the weight % based on the total weight of the combination A) to C); wherein said process comprises the steps of; (i) mixing the components A), B) and C); (ii) melt extruding the mixture of step (i) to form a homogeneous mixture of A), B), and C) while (iii) removing water and/or solvent from component B) before or during the extrusion process; (iii) cooling the extruded mixture; and (iv) grinding the extruded mixture to form a finely divided powder.

* * * * *